United States Patent

[11] 3,600,112

| [72] | Inventors | Robert Lehner<br>Baltimore;<br>David Sylvester, Phoenix, both of, Md. |
|---|---|---|
| [21] | Appl. No. | 20,279 |
| [22] | Filed | Mar. 17, 1970 |
| [45] | Patented | Aug. 17, 1971 |
| [73] | Assignee | The United States of America as represented by the Secretary of the Air Force |

[54] SOLID-PROPELLANT-ACTUATED HYDRAULIC POWER UNIT
8 Claims, 6 Drawing Figs.

[52] U.S. Cl. .................................................... 417/364
[51] Int. Cl. .................................................... F04b 17/00, F04b 35/02
[50] Field of Search .......................................... 417/364; 60/26.1, 26.11

[56] References Cited
UNITED STATES PATENTS
3,172,596  9/1953  Deardorff et al. ............  417/364 X
2,652,781  3/1965  King ............................  417/364

*Primary Examiner*—Carlton R. Croyle
*Assistant Examiner*—Richard J. Sher
*Attorneys*—Harry A. Herbert, Jr. and Arthur R. Parker ABSTRACT: A hydraulic power unit including a solid propellant-hot-gas energy source, a gas accumulator communicating with the exhaust from the source, hydraulic oil accumulator, and a precharge gas accumulator supplying nitrogen gas under pressure to one side of the oil accumulator. Pressure formed by the firing of the hot-gas energy source-propellant acts against, and operates a double-piston mechanism consisting of a pair of separated pistons respectively arranged between the gas and oil accumulators to thereby compress the nitrogen gas in the oil accumulator by one side of the piston positioned therein. Hydraulic oil is simultaneously drawn from an oil reservoir into the oil accumulator on the other side of the said piston where it becomes pressurized by the precharged nitrogen gas for its later use in a hydraulically operated lift system.

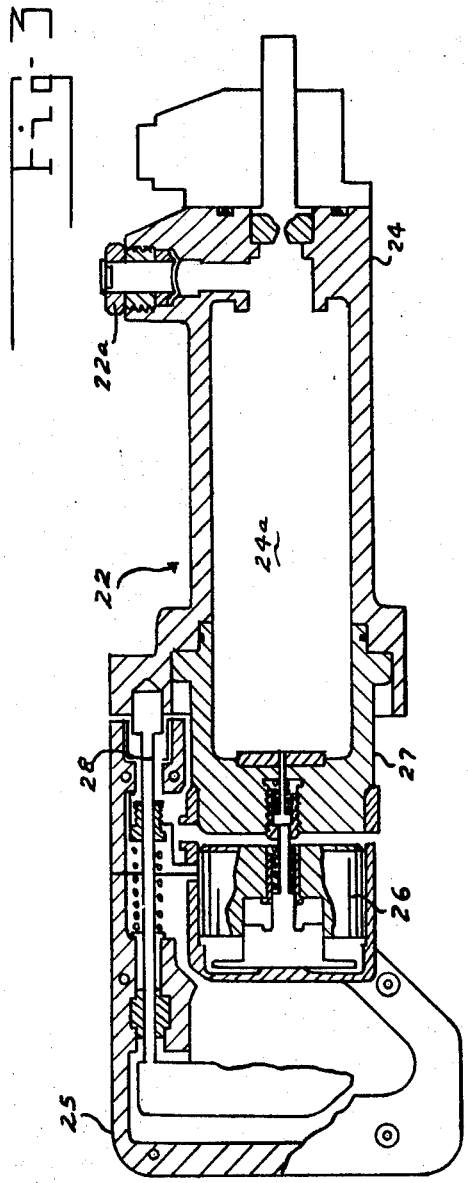
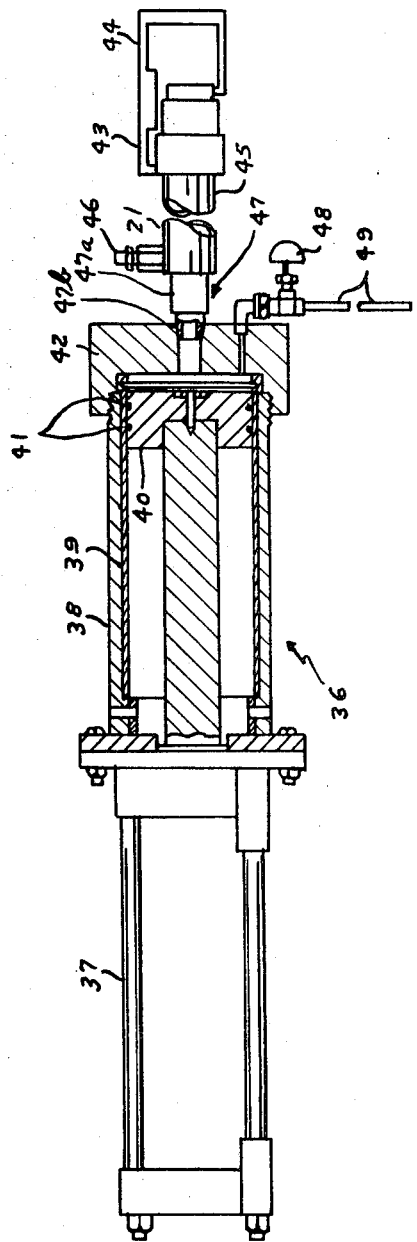

SOLID-PROPELLANT-ACTUATED HYDRAULIC POWER UNIT

BACKGROUND OF THE INVENTION

This invention relates generally to the field of hydraulically operated power units and, in particular, to the improved pressurization of hydraulic oil by the unique use of a hot-gas energy source.

In connection with the use of an improved military weapons handling and loading trailer for loading bombs and other munitions on aircraft, which trailer is under current development and is known as the SEALs (Stored energy actuated lift system) loading trailer MHU–92/M, a need for the development of an improved power unit for use with the said loading trailer became apparent. As a result of a study of the feasibility of utilizing a gas generator either to replace or to be interchangeable with the presently used gasoline engine power unit originally installed on the aforementioned trailer, the new and uniquely combined gas generator power unit of the present invention was developed. This system, which will be hereinafter disclosed in the following summary and detailed description, involves the use of a basic power unit, that is, in substance, currently available on the commercial market, and which is in unique and yet simplified combination with an improved hydropneumatic circuit for pressurizing a supply of hydraulic oil.

SUMMARY OF THE INVENTION

The present invention consists briefly in the use of a solid-propellant grain device as a hot-gas energy source to charge a supply of hydraulic oil stored in an oil accumulator for its future use in a bomb-lift system. For this purpose, a hot-gas accumulator is positioned in open communication with the exhaust from said energy source, and is further interposed between the energy source and the hydraulic oil accumulator.

On firing the hot-gas energy source-propellant grain, the exhaust therefrom acts upon, and thereby drives or strokes a first piston positioned within the hot-gas accumulator and a second piston rigidly interconnected therewith and positioned in the hydraulic oil accumulator. This simultaneous stroking action causes the second piston within the hydraulic oil accumulator to compress a supply of nitrogen gas previously supplied to the oil accumulator from a precharge gas accumulator in communication therewith. Simultaneous with the aforementioned compression stroke, hydraulic oil is drawn from an oil reservoir and stored in the oil accumulator on the side of the piston opposite from the compressed nitrogen gas, which nitrogen gas thereby effects pressurization of the said hydraulic oil for its later use with the aforementioned SEALS trailer, or any other suitable hydraulically operated system adapted to be interconnected therewith.

Other advantages, as well as objects of the invention, will become readily apparent from the following disclosure thereof, taken in connection with the accompanying drawings, in which;

BRIEF DESCRIPTION OF THE DRAWINGS

FIGS. 3 and 3a respectively illustrate combined longitudinal sectional and schematic layout views of a commercial type of gas generator assembly utilized in the initial testing of the present invention; and FIG. 4 is a partly broken-away and longitudinal sectional view of the gas generator assembly used in subsequent tests of the present invention as a proposed substitute for the gas generator assembly of FIGS. 3 and 3a, and representing a prototype model thereof.

DESCRIPTION OF THE PREFERRED EMBODIMENT

Figure 1:
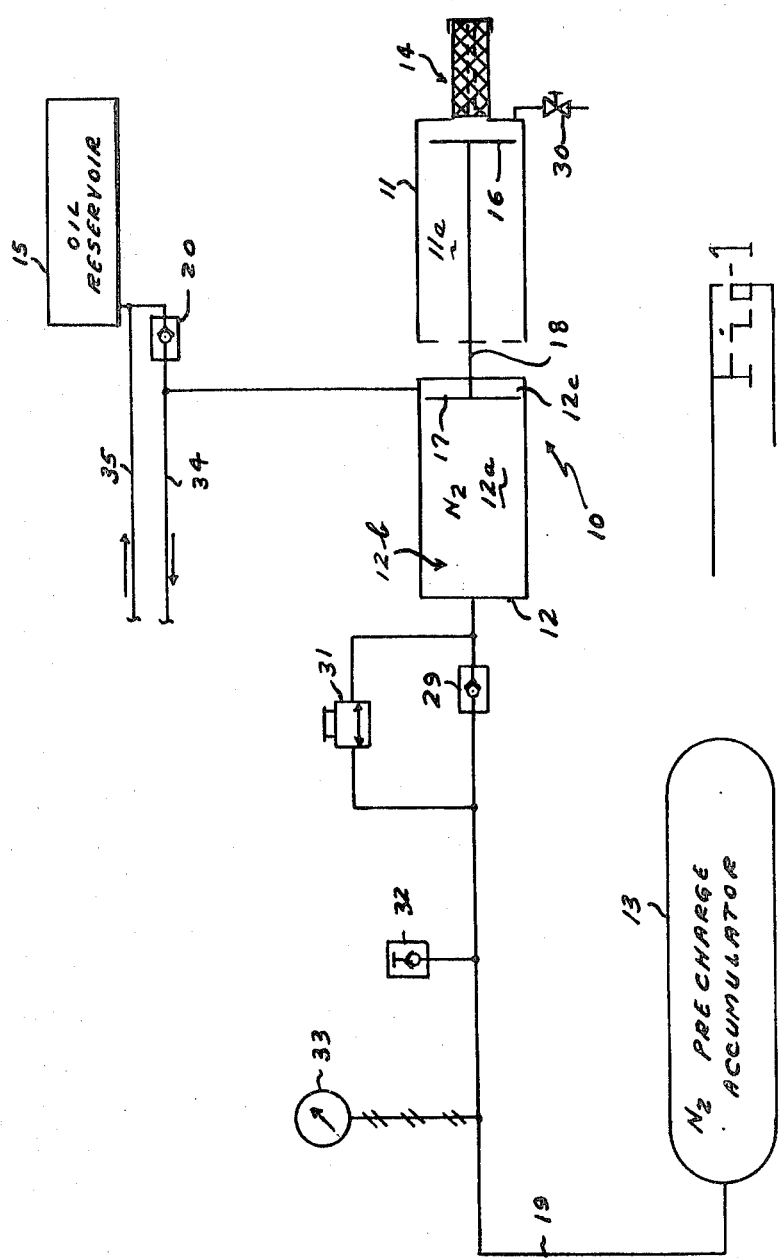
FIG. 1 represents an overall schematic view of the novel gas generator power unit of the present invention.

Referring generally to the drawings and, in particular, to FIG. 1 thereof, the overall gas generator or basic power unit of the present invention is indicated generally at 10 as consisting principally of a hot-gas accumulator housing 11 incorporating a first, hot-gas chamber at 11a; a hydraulic oil accumulator housing 12 incorporating a second, nitrogen gas chamber 12a, a precharge, nitrogen gas accumulator 13, and a hydraulic oil reservoir 15. A key feature of the present invention resides in the utilization of a hot-gas source, indicated generally at 14, as being interconnected at one end of, and therefore in a unique and yet simplified combination with the first chamber 11a of the said hot-gas accumulator housing 11. The novel operation of this inventive arrangement to uniquely draw into, and pressurize a supply of hydraulic oil in the oil accumulator housing 12 will be hereinafter described in detail. To further ensure the accomplishment of this purpose, a double-piston arrangement consisting of a first piston 16 positioned within the gas accumulator housing-chamber 11a, and a second piston 17 positioned within the oil accumulator housing-chamber 12a, and rigidly attached with the first piston 16 by means of the piston rod 18, is interconnected between the said gas and oil accumulators, as is clearly illustrated in the said FIG. 1. Thus, any moving or stroking force applied to one of said pistons will automatically impart simultaneous and equal movement with equivalent force to the other of said pistons. The second piston 17 further divides the second chamber 12a into a precharged, nitrogen gas chamber portion 12b and an oil accumulator chamber portion 12c for a purpose to become self-evident hereinafter in connection with a description of the operation of the present invention.

Figure 3A:
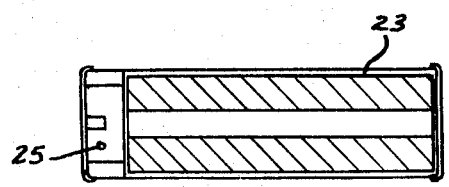

As seen particularly in FIGS. 3 and 3a of the drawings, one form of the previously referred to hot-gas energy source, indicated generally at 14 in FIG. 1, is illustrated as consisting of the gas generator-breech mechanism and a solid-propellant cartridge, indicated respectively at 22 and 23. This arrangement, selected as a result of an investigation of commercially available gas generator systems, was determined to be most suitable for application in, and for the testing of the present invention. The system actually chosen, and illustrated in the aforesaid FIGS. 3 and 3a, in fact, constitutes an arrangement developed by the Olin Mathieson Chemical Corporation, and was found to satisfy both the requirements and energy being sought for use in the inventive system. The aforementioned breech mechanism and cartridge 22, 23 are known as the Diesel Starting System, and further include a breech housing at 24 having a cartridge-carrying or mounting chamber at 24a, a handle portion at 25 which mounts a solenoid-firing mechanism indicated generally at 26, and an end cap element 27, which incorporates for its operation an interrupted locking thread. An elongated locking pin at 28 completes the principal parts of the aforesaid gas generator breech mechanism 22.

Again referring specifically to FIGS. 1, 3 and 3a of the drawings, the novel system of the present invention is placed in operation by initially inserting a solid-propellant cartridge, as at 23 in FIG. 3a, which cartridge is a percussion-fired member, within the aforementioned chamber 24a of the breech housing 24. Cartridge 23 is then sealed in the said chamber 24a by use of the interrupted locking thread-end cap element 27 being clamped thereto in the manner illustrated. The latter is, in turn, locked in place by the elongated locking pin 28, which pin is operated to its locking position by the manipulation of the handle member within an appropriate seat in a slot provided therefor in the said end cap element 27.

Although the firing mechanism 26 (FIG. 3) is disclosed as constituting a solenoid-operated mechanism, the use of the commercially available breech mechanism 22 is obviously not limited thereto and, in fact, a proposed prototype model of the present invention actually contemplates the use of a mechanical firing mechanism. The latter is not illustrated since the specific details thereof are unimportant to the present invention. In any event, whether a solenoid or mechanical firing mechanism is utilized, upon initiation of the percussion-fired solid-propellant cartridge 23 by the firing pin penetration of its primer element at 25 (FIG. 3a), hot-gas is generated from the relatively slow-burning propellant grain, which hot-gas is then exhausted into the hot-gas chamber 11a of the hot-gas accumulator housing 11 where it acts against the upstream face or side of the piston 16 positioned therein (Note FIG. 1). As the gas pressure in the said chamber 11a builds up and then increases above the predetermined pressure of the precharged nitrogen gas in the chamber portion 12b of the hydraulic oil accumulator housing 12, the double-piston configuration comprising the pistons 16 and 17 is moved or stroked to the left as viewed in FIG. 1. A pressure differential is thereby created across the check valve located at 29 in a nitrogen gas line 19 positioned between the precharge and oil accumulators 13 and 12. This pressure differential then causes hydraulic oil to flow into the chamber portion 12c of the oil accumulator housing 12 from the oil reservoir at 15 by way of the hydraulic line 21 and a second check valve at 20 controlling the flow from the said reservoir. The above-described stroking action of the said double-piston configuration occurs during the burning of the solid propellant in the cartridge 23 (FIG. 3a). After this propellant burning has ceased, the hot-gas accumulated in the chamber 11a of the gas housing 11 may be dumped through an exhaust valve at 30. Also, for safety reasons, a blowout pressure relief valve for the breech housing 22 is utilized at 22a. To complete the operation and/or control of the inventive gas generator power unit, an isolation valve, a nitrogen charging valve and a precharge accumulator pressure gage may be positioned as shown respectively at 31, 32 and 33 in the precharge accumulator line 19. The pressurized hydraulic oil may then be stored and used as required for the previously referred to trailer lift system, or, for that matter, in any other appropriate hydraulic power-actuated system, by way of the outgoing and incoming hydraulic oil lines indicated schematically and in broken-away manner at 34 and 35 respectively.

During tests of the inventive hydraulic system, the gas outlet side of the gas generator breech mechanism 24 of the inventive form of FIG. 3 was actually slightly modified to that illustrated in the basic engineering power unit indicated generally at 36 in FIG. 4. Again, quite similar to the arrangement of FIG. 3, this unit, which may constitute the prototype model, is shown as consisting of a hydraulic cylinder or oil accumulator housing at 37; a hot-gas accumulator housing 38; a housing liner element at 39; a piston at 40, which, as in the case of the previously noted arrangement of FIG. 3, may be easily sealed to the inner wall surface of the liner 39 by means of a plurality of O-ring seals at 41; a housing end cap member 42, and a breech assembly at 43, similar to that previously described at 22 in FIG. 3.

The above-referred to breech assembly 43 consists, in part, of the handle portion 44, the breech housing 45, and a blowout pressure relief valve at 46, similar to that indicated at 22a in the inventive form of FIG. 3. The said breech assembly 43 is quite similar in operation and structure to the breech mechanism 22 disclosed in the said FIG. 3, except for the gas outlet or exhaust end of its housing 45, or, in other words, that area indicated generally at the reference 47. For purposes of the particular tests involved, the said gas outlet end consisted of a first relatively enlarged hollow shaft portion 47a and a reduced shaft portion 47b, which is externally threaded and thereby attached to an internally threaded opening portion formed within the aforementioned housing end cap member 42. An exhaust valve and exhaust outlet line respectively indicated at 48 and 49 may be used to dump the hot gas formed within the chamber in the front of the piston 40 in similar manner to that effected by the dump valve schematically illustrated at 30 in the view of FIG. 1.

Figure 2:
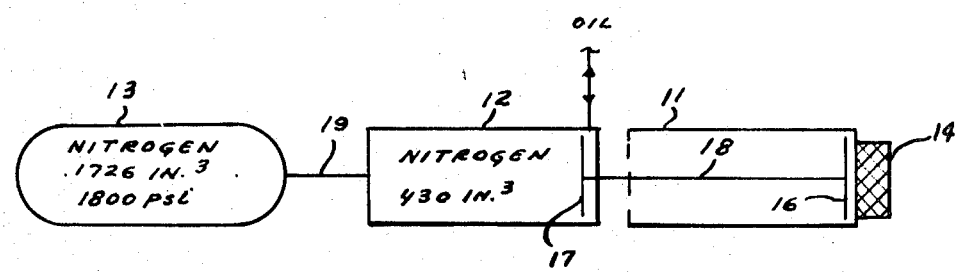
FIGS. 2 and 2a respectively represent additional schematic views of the invention, illustrating the overall operation of the basic power unit of FIG. 1, as it appears both before and after the compression stroke thereof.
Figure 2A:
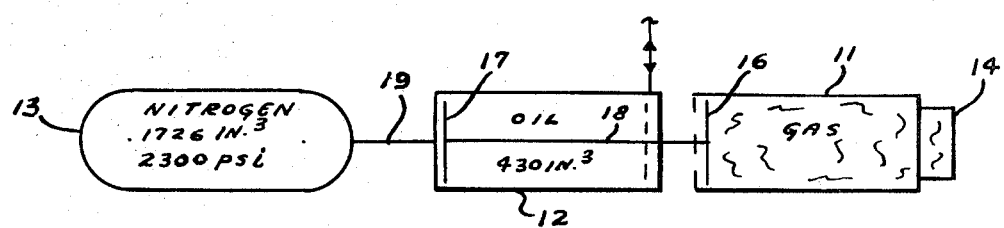

With the use of the above-described basic engineering power unit, representing the gas generator hydraulic power unit of the invention, indicated generally at 10 in FIG. 1, a study was made of a number of available cartridges and it was determined that the Olin Mathieson Chemical Corporation diesel truck starter cartridge substantially met all requirements for the gas generator portion of the present invention and had an energy output sufficient to charge the hot-gas accumulator housing 11 under all environmental conditions. Thus, for example, the solid propellant cartridge developed by the Olin Mathieson Corporation, such as that previously described at 23 in FIG. 3a, when used with the overall hydraulic power unit of the present invention, complied with a specified set of design operating conditions and requirements previously determined to be needed for the hot-gas energy source 14 portion of the overall power unit of the invention in its use, for example, to actuate the bomb-lift system utilized with the previously mentioned weapons handling and bomb-loading trailer unit. In this connection, and with particular reference to FIGS. 2 and 2a of the drawings, the aforementioned operating conditions prevalent with the use of the inventive hydraulic power unit 10, both before and after the compression stroke thereof has been clearly depicted. In FIG. 2, it is seen that, in one test, before the compression stroke occurring as a result of the ignition of the solid propellant grain in the hot-gas generator 14, the precharged nitrogen gas within the precharge accumulator 13 was confined within a volume of 1726 in.$^3$, and was charged at an initial pressure of 1800 p.s.i., whereas, after the compression stroke (FIG. 2a), the pressure of the precharged nitrogen gas in the same precharged accumulator 13 increased to 2300 p.s.i. This result occurred with the precharged nitrogen gas initially confined in the oil accumulator 12, before the compression stroke (FIG. 2) in a volume of 430 in.$^3$, whereas, after the compression thereof, the said nitrogen gas is shown compressed to a volume of practically zero insofar as the said oil accumulator 12 is concerned. Of course, at this point, the burning of the solid propellant grain 23 has stopped, and the supply of hydraulic oil simultaneously drawn into the accumulator 12 has now been uniquely pressurized by the action of the precharged and further compressed nitrogen gas.

From an analysis of the operating conditions and the lift system mechanism to be utilized with the previously noted trailer system, it was determined that, in order to lift a store to maximum height and, at the same time, permit up-and-down attitude adjustments thereof, it becomes necessary to displace some 395 cubic inches of hydraulic oil. As a result thereof, it has been estimated that the nitrogen gas in the precharge accumulator housing 13 (FIG. 1) should be precharged at 1800 p.s.i. and that a displacement of 430 in.$^3$, as has already been described in connection with FIGS. 2 and 2a, would provide a sufficient margin of safety to ensure the reliable operation of the inventive system.

Thus, a new and improved hydraulic power unit has been developed by the unique combination of the present invention, which includes the utilization of a solid-propellant, hot-gas energy source in novel arrangement with both hydraulic oil and precharged gas accumulators to thereby pressurize a supply of hydraulic o8l at a sufficient pressure to produce an energy output adequate to lift a 7000-pound load from minimum to maximum height, and therefore, satisfactorily operate bomb and other store-lift systems of significant proportions.

We claim:

1. A hydraulic power unit comprising; a first, pressure-receiving and transferring housing having a first, hot-gas pressure-containing chamber; a second, hydraulic oil accumulator housing adaptable to be interconnected with said first housing and having a second, hydraulic oil-collecting chamber; combined motion- and energy-transmitting means mounted between said first and second housings and comprising a first, force-transferring member positioned in slidable and sealed relation within said first chamber and a second, force-transferring member rigidly interconnected with said first, force-transferring member and slidably positioned in sealed relation within said second chamber, said second, force-transferring member further dividing said second chamber into a first, hydraulic oil-receiving chamber portion and a second precharged gas-receiving chamber portion; a third, precharge accumulator positioned in communication with, and containing a source of precharged gas for supply to said second chamber portion of said oil accumulator; a hydraulic oil reservoir communicating with the said first chamber portion of said oil accumulator housing-chamber for delivering a supply of hydraulic oil thereinto; and means in communication with the chamber of said first, pressure-receiving and transferring housing for generating and applying a force to, and thereby effecting movement of said first, force-transferring member and the second, force-transferring member rigidly interconnected therewith into a stroking cycle resulting in the further compression of the precharged gas supplied to the said second chamber portion of said oil accumulator housing, said stroking cycle-movement of said second, force-transferring member thereby simultaneously drawing hydraulic oil from said oil reservoir into said first, hydraulic oil-receiving chamber portion for the subsequent automatic pressurization thereof by said precharged gas after the completion of the said force-transferring stroking action.

2. In a hydraulic power unit as in claim 1, wherein each of said first and second, force-transferring members comprises a piston rigidly mounted on opposite end portions of a piston rod extending between said first and second housings.

3. In a hydraulic power unit as in claim 1, wherein said first, pressure-receiving and transferring housing comprises a hot-gas accumulator.

4. In a hydraulic power unit as in claim 3, wherein said force-generating and applying means comprises a hot-gas energy source.

5. In a hydraulic power unit as in claim 3, wherein said force-generating and applying means comprises a hot-gas energy source including a solid propellant, gas-generating means incorporating an exhaust section in communication with the chamber of said hot-gas accumulator.

6. In a hydraulic power unit as in claim 1, wherein said combined motion- and energy-transmitting means comprises a pair of pistons respectively positioned in said first and second-named chambers of said first and second housings; and said pressure-generating and applying means comprises a hot-gas energy source for producing gas under pressure for application against, and providing the said stroking movement to the piston positioned in said first housing.

7. In a hydraulic power unit as in claim 6, wherein said hot-gas energy source comprises a combined breech housing, and a percussion-fired, solid propellant cartridge positioned within said breech housing.

8. In a hydraulic power unit as in claim 1, wherein said first housing comprises a hot-gas accumulator; said combined motion and energy-transmitting means comprises a double-piston mechanism respectively positioned within each of said gas and oil accumulators; and said force-generating and applying means comprises a hot-gas generator consisting of a solid propellant-actuated device developing a gas pressure increasing above the pressure of the precharged gas previously supplied to said second hydraulic oil accumulator to move said double-piston mechanism against, and thus further compress the said precharged gas and simultaneously pump hydraulic oil into said oil accumulator from said oil reservoir through a check valve-controlled oil line, thereby retaining said oil in said oil accumulator for pressurization by said precharged gas.